United States Patent [19]

Simin

[11] Patent Number: 4,765,346

[45] Date of Patent: Aug. 23, 1988

[54] ASHTRAY ASSEMBLY

[75] Inventor: Gerald L. Simin, Holly, Mich.

[73] Assignee: General Motors Corporation, Detroit, Mich.

[21] Appl. No.: 933,878

[22] Filed: Nov. 24, 1986

[51] Int. Cl.⁴ ............................................. A24F 19/06
[52] U.S. Cl. .................................................. 131/231
[58] Field of Search ............................. 131/231, 235.1

[56] References Cited

U.S. PATENT DOCUMENTS

| | | |
|---|---|---|
| 72,274 | 12/1867 | Dunning . |
| 2,377,713 | 6/1945 | Penney et al. . |
| 2,576,019 | 11/1951 | Kisselle . |
| 2,918,890 | 12/1959 | Gail . |
| 3,038,629 | 6/1962 | Morton . |
| 3,345,776 | 10/1967 | Carson . |
| 3,406,813 | 10/1968 | Anchell . |
| 3,457,675 | 7/1969 | Armstrong . |
| 3,685,093 | 8/1972 | Sanders et al. . |
| 3,994,308 | 11/1976 | Pancer ................................. 131/256 |
| 4,103,956 | 8/1978 | Faulstich . |
| 4,453,345 | 6/1984 | Maus . |
| 4,570,647 | 2/1986 | Pater ..................................... 131/235 |

Primary Examiner—V. Millin
Attorney, Agent, or Firm—Herbert Furman

[57] ABSTRACT

An ashtray assembly for vehicles includes a support having a lower wall and side walls pivoted within the confines of an opening in a vehicle for movement about its lower portion between a non-operative position and an operative position extending outwardly and upwardly of the opening. An ash receiving receptacle having open upper and lower walls is pivoted to the upper portion of the support for movement therewith as a unit or movement outwardly relative thereto to a dump position. The open lower wall of the receptacle is closed by the lower wall of the support to provide an ashtray when the support and receptacle move as a unit.

7 Claims, 2 Drawing Sheets

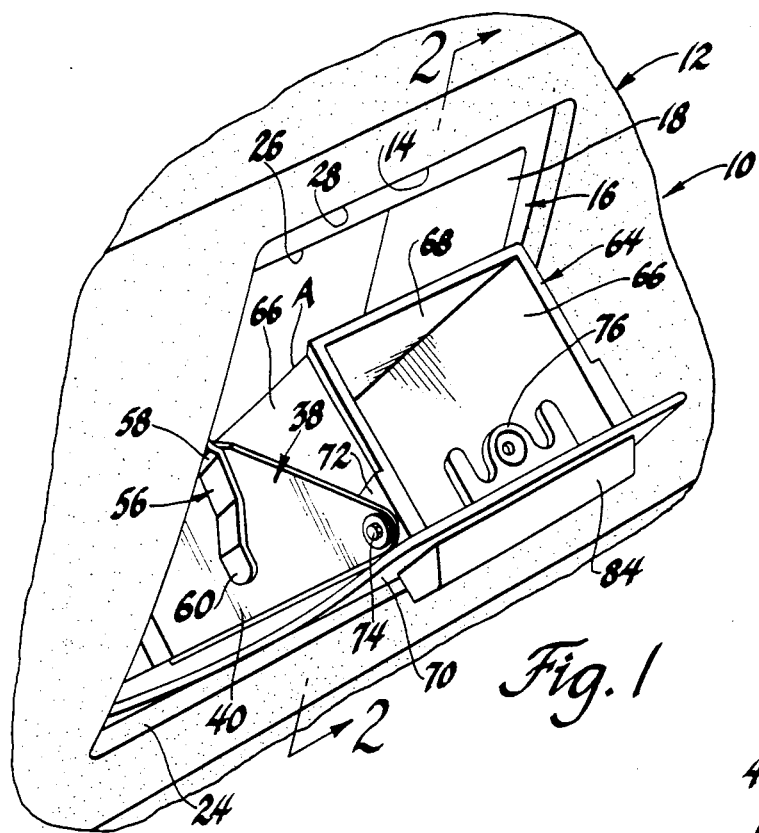
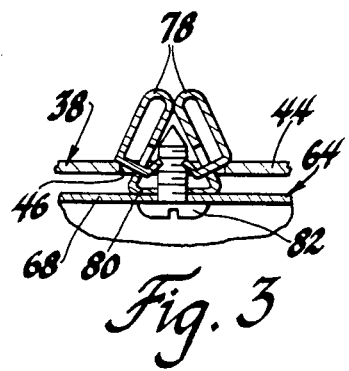
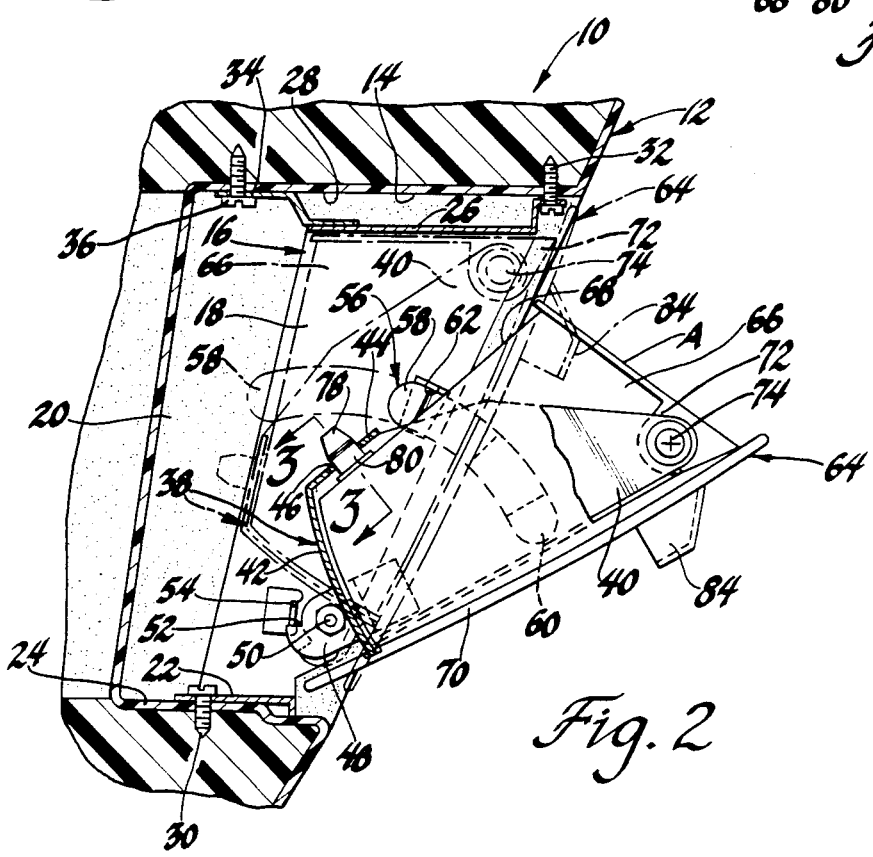

ASHTRAY ASSEMBLY

This invention relates generally to ashtray assemblies and more particularly to ashtray assemblies for vehicles.

Current and past production vehicles normally include an ashtray assembly in the instrument panel for use by the driver and front seat passengers. Such ashtray assemblies are normally of two types, a slide type, generally in the form of a receptacle which slides in and out of the instrument panel, or a pivoting type which pivots about its lower portion between open and closed positions with respect to the instrument panel. It is also known to provide these types of ashtrays and other types in armrests or consoles of the vehicle.

When it is necessary to empty the contents of the slide type of ashtray, a spring detent must normally be released in order for the entire ashtray assembly to be removed from the instrument panel or support so that the contents can be dumped. Certain of the pivoting types are also emptied in the same manner. Other pivoting type ashtrays include a receptacle which is releasably secured to a door or closure so that it can be removed for emptying. The armrest and console type ashtrays generally include a receptacle which is releasably retained in the console or arm rest so that it can be removed and emptied. The cover for the receptacle can either be pivoted to the ashtray or be separate therefrom and pivoted to the console or arm rest.

The ashtray assembly of this invention differs from such known ashtrays in that the receptacle is not removed in order to be emptied.

In the preferred embodiment of the invention, the ashtray assembly includes a support and an ash receiving receptacle. The support is pivoted adjacent its lower or base wall within an opening in the vehicle, such as within the instrument panel, for movement between a non-operative position within the confines of the opening and an operative position wherein the support extends outwardly and upwardly of such opening. A detent arrangement is provided between the side walls of the support and those of the opening to releasably locate the support in either position.

The receptacle has open upper and lower walls. The side walls of the receptacle are pivoted to the side walls of the support adjacent the open upper wall thereof for pivoting movement of the receptacle relative to the support between a closed position within the support, wherein the lower wall of the support closes the lower wall of the receptacle, and a dump position wherein the receptacle is pivoted outwardly so that the contents thereof can be dumped. A detent arrangement between the receptacle and the support normally maintains the receptacle in the closed position so that it moves as a unit with the support. Thus, the ashtray assembly of this invention functions as an ashtray during use by occupants of the vehicle and can be easily dumped whenever necessary by moving the support and ashtray as a unit to operative position and then pivoting the receptacle relative to the support.

The primary feature of this invention is that it provides an improved ashtray assembly for vehicles wherein an ash receiving receptacle can be emptied or dumped without being required to be released from its support. Another feature is that the support is pivoted within an opening of the vehicle for movement between operative and non-operative positions relative thereto, and the receptacle is pivoted to the support for movement therewith as a unit and movement relative thereto to a dump position. A further feature is that the support is located within the confines of the opening of the vehicle when in the non-operative position and extends outwardly and upwardly of such opening in the operative position, and that the receptacle is pivoted forwardly and outwardly thereof when moved to the dump position. Yet another feature is that the support is releasably located relative to the opening in both operative and non-operative positions and the receptacle is releasably retained to the support for movement therewith as a unit. Yet a further feature is that the receptacle has open upper and lower walls, and has its lower wall closed by a lower wall of the support when the receptacle is in closed position relative to the support.

These and other features will be readily apparent from the following specification and drawings wherein:

BRIEF DESCRIPTION OF DRAWINGS

FIG. 1 is a partial view of a portion of an instrument panel of a vehicle having mounted therein an ashtray assembly according to this invention, with the support and ashtray of the assembly being shown in their respective operative and closed positions.

FIG. 2 is an enlarged view taken generally along line 2—2 of FIG. 1 and also showing the ashtray assembly in dash lines in non-operative position.

FIG. 3 is an enlarged sectional view taken on line 3—3 of FIG. 2.

Figure 4:
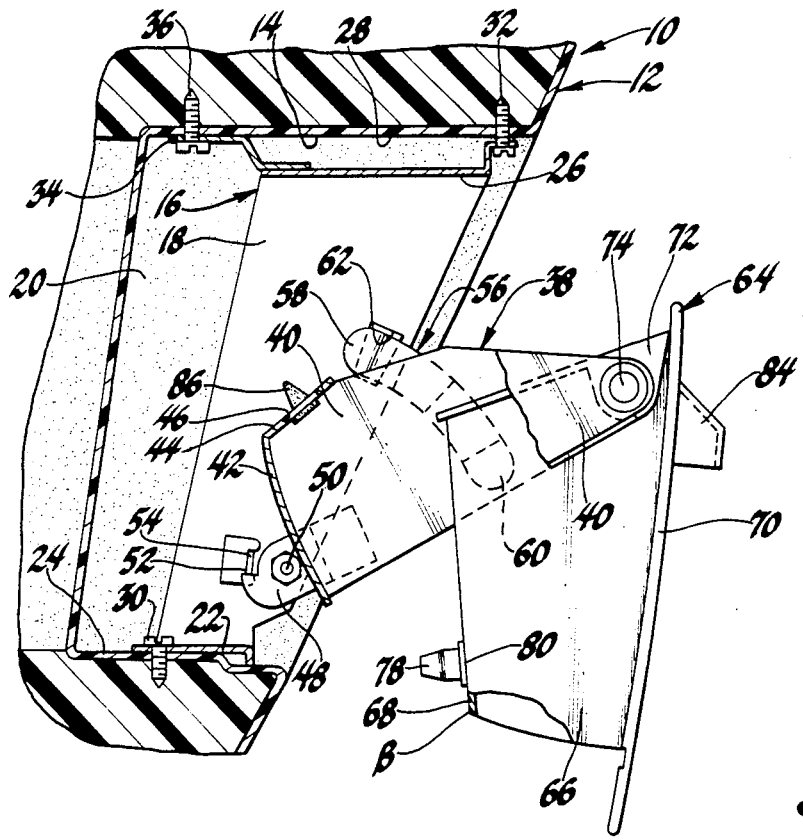
FIG. 4 is a view similar to FIG. 2 and showing the ash receptacle in dump position relative to the support.

Referring now to the drawings, a vehicle designated generally 10 includes an instrument panel 12 which is provided with an opening 14. The vehicle, instrument panel, and opening are of conventional construction. A frame 16 is of the general shape of the opening 14 and inset therein. The frame 16 includes side walls 18 located adjacent the corresponding side walls 20 of the opening 14, a lower or base wall 22 which seats on a like wall 24 of the opening 14, and an upper wall 26 which is spaced from a corresponding wall 28 of the opening 14. Screws 30 extend from wall 22 and through wall 24 into the instrument panel 12 to secure wall 22 of the frame 16 within the opening. Like screws 32 extend through the flanged rearward edge of wall 26 and into the instrument panel 12 for the same purpose. An offset bracket 34 extends forwardly from wall 26. A screw 36 extends through the bracket and wall 14 into the instrument panel. Thus, the frame 26 is has its upper and lower walls secured to the instrument panel 12 within the opening 14.

A generally U-shaped support 38 includes side walls 40, a lower or base wall 42, and a partially rear wall 44 having a generally square shaped opening 46. An offset bracket 48 is welded to each side wall 40 and extends downwardly therefrom. The brackets 48 are coaxially pivoted at 50 to respective side walls 18 of frame 16 to thereby mount the support 38 to the frame 16 for pivoting movement between a non-operative position as shown in dash lines in FIG. 2, and an operative position as shown in full lines therein, and in full lines in FIGS. 1, 4 and 5. Each bracket 48 includes a shoulder 52 which engages a lanced lateral tab 54 of a corresponding side wall 18 to locate the support 38 in the operative position. Each side wall 40 further includes a detent member 56 having angled spring legs 58 and 60 which are selectively and alternately engageable within an opening 62 of a corresponding wall 18 to releasably locate the support 38 in either its non-operative or operative position.

An ash receiving receptacle 64 includes side walls 66, a forward wall 68 and a rearward wall in the form of a cover 70 of generally the size of the opening 14 in the instrument panel 12. Each of the side walls 66 includes an embossment 72 which are coaxially pivoted at 74 to corresponding side walls 40 of the support 38 to pivot the receptacle 64 to the support for movement between a closed position with respect thereto as shown in full lines in FIGS. 1 and 2 and designated A and a dump position as shown in full lines in FIGS. 4 and 5 and designated B. As shown in FIG. 1, a cigarette snuffer and holder 76 extends from the cover 70 into the upper opening of the receptacle 64. When the receptacle 64 is in its closed position, the reverse bent legs 78 of a spring clip 80, FIG. 3, are received within the opening 46 to releasably retain the receptacle 64 in its closed position for movement with the support 38 between its operative and non-operative positions. The clip 80 is screwed at 82 to the forward wall 68 of the receptacle 64. In the closed position of the receptacle, the lower wall 42 of the support 38 closes the lower open wall of the receptacle and cooperates therewith in providing an ashtray for receipt of ashes and cigarettes and other smoking materials deposited therein by the occupants of the vehicle. The cover 70 is provided with a conventional finger receiving handle 84.

When the spring clip 80 releasably retains the receptacle 64 in its closed position A relative to the support 38, the support and receptacle move as a unit between a non-operative position as shown in dash lines in FIG. 2 and an operative position as shown in full lines therein. The spring force of the legs 78 of the spring clip 80 against the edges of the opening 46 is sufficient to maintain the receptacle 46 in its closed position A over the manual force necessary to be applied to handle 84 to disengage legs 58 and 60 from openings 62. The engagement of the shoulders 52 with the tabs 54 locates the ashtray and support unit in operative position and the alternate engagement of the spring legs 58 and 60 with the openings 62 releasably maintains the support and receptacle in either operative or non-operative position without rattling or noise.

Figure 5:
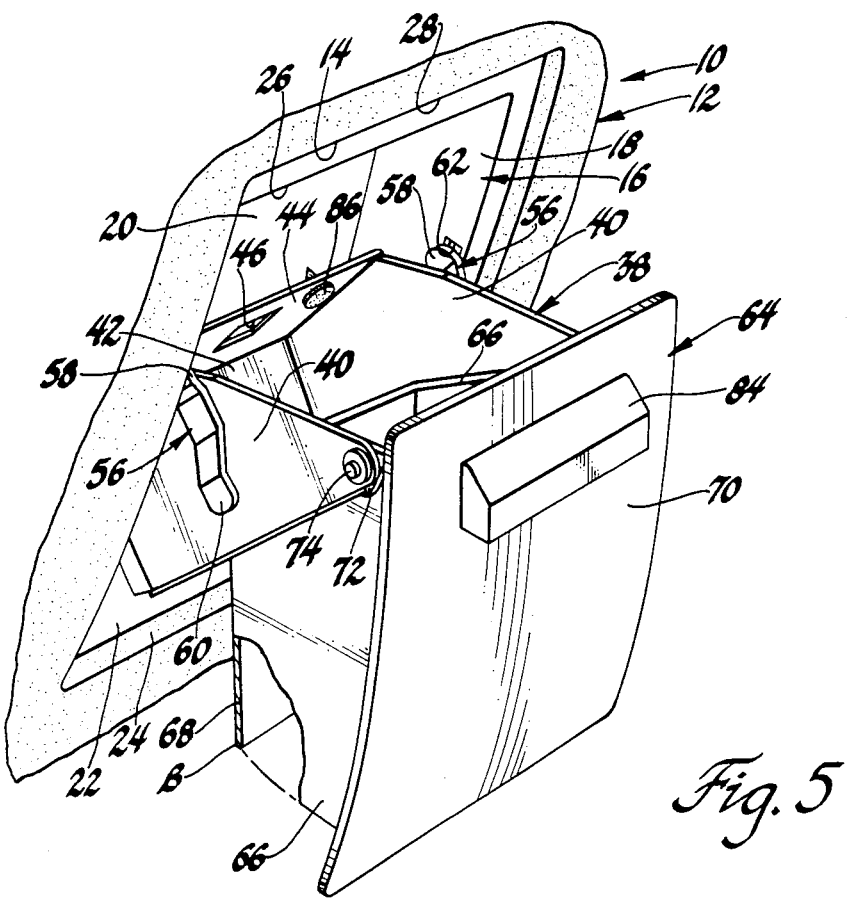
FIG. 5 is a perspective view showing the receptacle in its dump position.

When it is desired to dump the contents of the receptacle 64, the support 38 and receptacle are moved as a unit to the operative position as shown in full lines in FIGS. 1 and 2. The occupant then manually grasps the handle 84 or the side edges of cover 70 and applies sufficient force to receptacle 64 to disengage legs 78 of clip 80 from opening 46 and pivot the receptacle 64 relative to the support 38 from closed position A to its dump position B as shown in full lines in FIGS. 4 and 5 so that the contents of the ashtray can be dumped. Since the open lower wall of the receptacle 64 is located close to the base wall 42 of the support, normally any smoking material debris will be moved outwardly of wall 42 by the forward wall 68 of the receptacle. Should any ashes cling to wall 42, they will be gravity dumped since it can be seen from FIGS. 4 and 5 that wall 42 is at an angle when the support 38 is in operative position. As shown in FIG. 5, one or more rubber bumpers 86 can be provided on wall 44 to cushion the wall 68 when the receptacle 64 is in the closed position A.

Although the ashtray assembly has been shown in conjunction with the instrument panel of a vehicle, it will be understood that it can be mounted in other locations on the vehicle.

Thus this invention provides an improved ashtray assembly for vehicles.

The embodiments of the invention in which an exclusive property or privilege is claimed are defined as follows:

1. An ashtray assembly for a vehicle comprising, in combination, a support having a base wall and side walls, means pivotally mounting the side walls of the support to corresponding side walls of an opening of the vehicle for movement of the support between a non-operative position within the confines of the vehicle opening and an operative position outwardly of the opening, an ash receptacle having upper and lower open walls, means pivotally mounting the receptacle to the side walls of the support for movement of the receptacle between a closed position within the support wherein the base wall of the support closes the lower wall of the receptacle and cooperates therewith in providing an ashtray when the support is in operative position, and a dump position wherein the receptacle is pivoted outwardly of the support when the support is in operative position to open the lower wall of the receptacle and permit dumping of ashes from the ashtray, and means releasably maintaining the receptacle in closed position for movement of the receptacle with the support between non-operative and operative positions.

2. In combination with a vehcle having an instrument panel provided with an opening having a base wall and a pair of side walls, an ashtray assembly comprising, a support having a base wall and a pair of side walls corresponding to like walls of the opening, means pivotally mounting the lower portions of the side walls of the support to the side walls of the opening for movement of the support between a non-operative position within the walls of the opening and an operative position wherein the support extends outwardly and upwardly of the opening, an ash receptacle having an outer wall and upper and lower open walls, means pivotally mounting the receptacle to the upper portions of the side walls of the support for movement of the receptacle between a closed position within the support wherein the base wall of the support closes the lower wall of the receptacle and cooperates therewith in providing an ashtray when the support is in operative position, and a dump position wherein the receptacle is pivoted outwardly of the support when the support is in operative position to open the lower wall of the receptacle and permit dumping of ashes from the ashtray, and means releasably maintaining the receptacle in the closed position thereof for movement of the receptacle with the support between non-operative and operative positions, the outer wall of the receptacle closing the opening of the vehicle when the receptacle is in closed position and the support is in non-operative position.

3. An ashtray assembly for a vehicle comprising, in combination, a walled support including a lower wall, means mounting the support within an opening of the vehicle for movement between a non-operative position within the confines of the opening and an operative position angularly outwardly of the opening, an ash receptacle having an outer wall and a lower open wall, means mounting the receptacle to the support for movement of the receptacle between a closed position within the support wherein the outer wall of the support closes the opening and the lower wall of the support closes the lower wall of the receptacle and cooperates therewith in providing an ashtray when the support is in the angular operative position, and a dump position wherein the receptacle is moved outwardly of the support when the support is in the operative position to open the lower wall of the receptacle and permits dumping of ashes from the ashtray, and means releasably maintaining the receptacle in closed position for movement of the receptacle with the support between non-operative and operative positions.

4. In combination with a vehicle having an instrument panel provided with an opening, an ashtray assembly comprising, a support having a lower wall and a pair of side walls, means mounting the lower portions of the side walls of the support to the instrument panel for movement of the support between a non-operative position within the opening and an operative position extending outwardly and upwardly of the opening, a walled ash receptacle having open upper and lower walls, means pivotally mounting the receptacle to the upper portions of the side walls of the support for movement of the receptacle between a closed position within the support wherein the lower wall of the support closes the lower wall of the receptacle and cooperates therewith in providing an ashtray, and a dump position wherein the receptacle is pivoted outwardly of the side walls of the support to open the lower wall of the receptacle and permit dumping of ashes from the ashtray, means releasably maintaining the receptacle in the closed position thereof for movement with the support between non-operative and operative positions, and means releasably detenting the support in each of the non-operative and operative positions.

5. The combination recited in claim 4 wherein the receptacle includes an outer wall of the size of the opening for closing the opening in the non-operative position of the support and closed position of the receptacle.

6. The combination recited in claim 4 including cooperating means between the support and the instrument panel releasably locating the support in the non-operative and operative positions.

7. The combination recited in claim 3 including means releasably detenting the support in the non-operative and operative positions.

* * * * *